United States Patent [19]
Yoshibe et al.

[11] Patent Number: 5,677,791
[45] Date of Patent: Oct. 14, 1997

[54] LENS BARREL HAVING AN IMAGE BLUR PREVENTION SYSTEM WITH IMPROVED ARRANGEMENT TO PREVENT FLARES

[75] Inventors: Koushi Yoshibe, Kawasaki; Akira Katayama, Koganei, both of Japan

[73] Assignee: Nikon Corporation, Tokyo, Japan

[21] Appl. No.: 360,161

[22] Filed: Dec. 20, 1994

[30] Foreign Application Priority Data

Dec. 20, 1993 [JP] Japan ................... 5-344532

[51] Int. Cl.$^6$ ................ G02B 15/14; G02B 7/02; G02B 27/64
[52] U.S. Cl. ................ 359/554; 359/723; 359/694; 354/430
[58] Field of Search ................ 359/554–557, 359/694–697, 738–740, 723, 813, 823; 354/430, 202; 348/208

[56] References Cited

U.S. PATENT DOCUMENTS

| | | | |
|---|---|---|---|
| 4,978,205 | 12/1990 | Sato | 359/557 |
| 5,018,845 | 5/1991 | Yamazaki | 359/557 |
| 5,202,992 | 4/1993 | Banno et al. | 359/676 |
| 5,212,589 | 5/1993 | Goodman | 359/723 |
| 5,331,467 | 7/1994 | Sato | 359/557 |
| 5,335,032 | 8/1994 | Onuki et al. | 354/195.1 |
| 5,377,048 | 12/1994 | Tada et al. | 359/694 |
| 5,416,558 | 5/1995 | Katayama et al. | 354/446 |
| 5,442,486 | 8/1995 | Sato | 359/557 |

*Primary Examiner*—Timothy P. Callahan
*Assistant Examiner*—Eunja Shin

[57] ABSTRACT

A lens barrel having an image blur prevention system incorporated into the lens barrel. The image blur prevention system includes an image blur prevention optical system which is arranged to eliminate the problem of harmful light entering the lens barrel. The lens barrel includes an aperture unit having an aperture stop which is positioned in the path of a main optical system, and a filter optical system which is secured to a filter retainer frame and positioned so that a specified interval is maintained between the filter retainer frame and the aperture stop. The image blur prevention optical system, which is moved in a plane perpendicular to the optical axis of the main optical system to prevent image blur, is located between the aperture stop and the filter optical system. When the image blur prevention optical system is moved to prevent image blur, the aperture stop and the retainer frame block harmful light. Further, an image blur prevention drive mechanism of the image blur prevention optical system is incorporated into a space between a retainer member of the aperture unit and a retainer member which holds the filter retainer frame to prevent dirt or dust from entering the drive mechanism.

18 Claims, 4 Drawing Sheets

LENS BARREL HAVING AN IMAGE BLUR PREVENTION SYSTEM WITH IMPROVED ARRANGEMENT TO PREVENT FLARES

BACKGROUND OF THE INVENTION

1. Field of the Invention

The present invention relates to an interchangeable lens barrel having an image blur prevention system incorporated therein and, more particularly, to a super-telescopic, large diameter, interchangeable lens barrel, including an image blur prevention system, which is arranged with respect to an aperture unit and a filter optical system such that harmful light in the lens barrel is cut off. The image blur prevention system components, such as the image blur prevention optical system and the image blur prevention optical system drive mechanism, are arranged in the lens barrel to effectively utilize the space in the lens barrel.

2. Description of the Related Art

Interchangeable lens barrels are known which may be easily attached to and removed from a camera, e.g., a single-lens reflex camera. The known types of interchangeable lens barrels may include, for example, a zooming mechanism, to adjust and vary the focal length of a picture taking lens optical system from telephoto to wide angle, and an autofocus mechanism (AF mechanism), to automatically perform subject focusing. Recently, image blur prevention mechanisms have also been incorporated into lens barrels to compensate for camera vibration, resulting in a considerable variety of functions incorporated into the lens barrel.

The types of lens barrels described above, which include the image blur prevention mechanism in conjunction with the various other mechanisms, have a variety of lens optical systems, and respective drive mechanisms, control circuits and sensors for the various lens optical systems, all of which are incorporated into the lens barrel. The size of the lens barrel is determined to a certain extent by the diameter of the picture taking lens optical system incorporated in the lens barrel. Since it is not desirable for the lens barrel to be made any larger than is necessary, the space inside the lens barrel must be used as effectively as possible. Therefore, the control circuits, the drive mechanisms, including electric motors, and the sensors must be efficiently incorporated in the lens barrel.

However, the following problems occur in the known types of lens barrels which include an image blur prevention mechanism. Specifically, the image blur prevention mechanism includes an image blur prevention optical system which is driven in a plane perpendicular to the optical axis of a main optical system to prevent image blur. However, according to the known arrangement of the image blur prevention optical system and the image blur prevention drive mechanism when the image blur prevention optical system is driven in a plane which is perpendicular to the optical axis, harmful light occurs at both the incident side and the exiting side of the image blur prevention optical system.

A device such as a flare stopper, which cuts off the harmful light while it is in the path of the main optical system, may be incorporated at an appropriate position in the lens barrel, but this would lead to an increase in the number of components in the lens barrel and would make the overall structure more complex. Further, problems in the areas of processability, ease of assembly, and cost would be unavoidable. Accordingly, there is a need for some type of countermeasure to solve the above-described types of problems occurring in the known lens barrels having an image blur prevention system.

SUMMARY OF THE INVENTION

Accordingly, it is an object of the present invention to provide a lens barrel which is simple in structure, inexpensive, and easy to assemble.

It is another object of the present invention to provide a lens barrel which includes an image blur prevention system.

It is a further object of the present invention to provide a lens barrel including an image blur prevention system having an image blur prevention optical system located in the lens barrel at a position which eliminates the problem of harmful light in the lens barrel accompanying movement of the image blur prevention optical system.

It is yet another object of the present invention to provide a lens barrel including an image blur prevention optical system wherein the image blur prevention optical system is positioned to improve the overall optical performance.

It is another object of the present invention to provide a lens barrel including an image blur prevention system having an image blur prevention optical system, a vibration sensor assembly and an image blur prevention system drive mechanism, wherein the positions of the components of the image blur prevention system are arranged to effectively utilize the space in the lens barrel and to improve optical performance.

It is another object of the present invention to provide a lens barrel including an image blur prevention optical system positioned between an aperture mechanism and a filter optical system such that harmful light accompanying the image blur prevention optical system's movement is cut off.

It is another object of the present invention to provide a super-telescopic, large-diameter lens barrel including an image blur prevention optical system and having a filter optical system at the rear-end side of the lens barrel to cut off certain wavelengths of light, and an aperture mechanism in the path of a main optical system, wherein the positional relationship between aperture mechanism, the filter optical system and the image blur prevention optical system is such that harmful light is cut off.

Additional objects and advantages of the invention will be set forth in part in the description which follows, and, in part, will be obvious from the description, or may be learned by practice of the invention.

Objects and advantages of the present invention are achieved by providing a lens barrel having an image blur prevention optical system which is moved in a plane perpendicular to the optical axis of a main optical system to prevent image blur. The image blur prevention optical system is positioned between an aperture unit and a filter optical system. More particularly, the image blur prevention optical system is positioned between an aperture stop of the aperture unit, positioned in the path of the main optical system, and a retainer frame of the filter optical system which is positioned so that a specified interval is left between the retainer frame and the aperture stop.

The lens barrel in accordance with the present invention incorporates an image blur prevention lens drive mechanism for moving the image blur prevention optical system in a plane which is perpendicular to the optical axis. The image blur prevention lens drive mechanism is incorporated into a space between an aperture unit retainer member, which holds the aperture stop, and a retainer member which holds the retainer frame of the filter optical system.

Thus, in accordance with the present invention, the aperture stop of the aperture unit and the filter optical system held by the retainer frame are positioned at the incidence side and at the exiting side, respectively, of the vibration prevention optical system so the harmful light on the incidence side of the image blur prevention optical system and harmful light on the exiting side of the image blur prevention optical system can be cut off by the aperture stop and the filter retainer frame. Thereby, deterioration in optical performance can be controlled and a flare stopper is not needed.

Further, in accordance with the present invention, because the image blur prevention drive mechanism is positioned between the aperture unit and the filter optical system, penetration of dirt or dust into the drive mechanism can be prevented, and operational defects in the image blur prevention operation of the image blur prevention drive mechanism can be eliminated.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
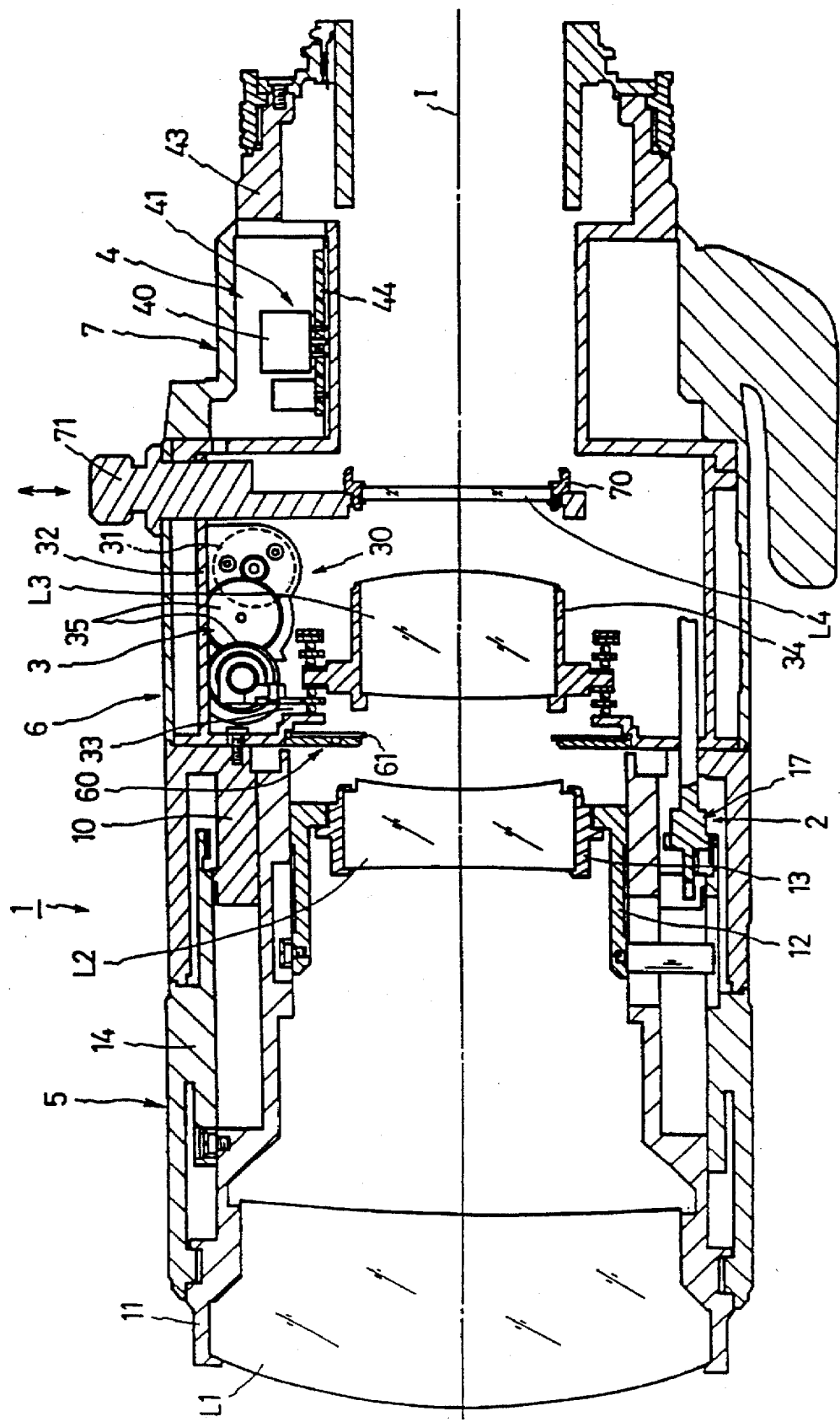
FIG. 1 is a cross-sectional view of a lens barrel in accordance with a first embodiment of the present invention.

Reference will now be made in detail to the preferred embodiments of the present invention, examples of which are illustrated in the accompanying drawings, wherein like reference numerals refer to like elements throughout.

Figure 2:
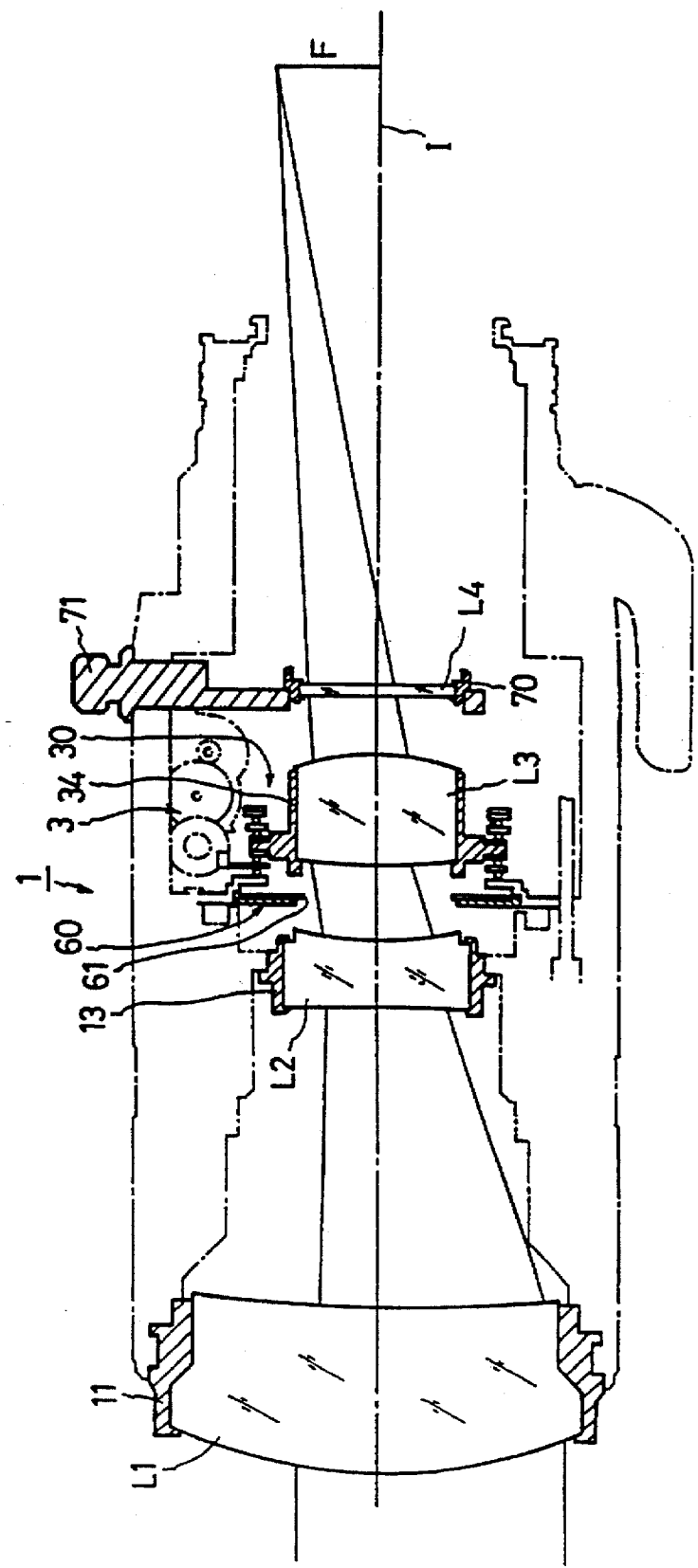
FIG. 2 is an outline diagram of the lens barrel of FIG. 1 showing the status of incident light for picture taking when the image blur prevention optical system is in an initial position.
Figure 3:
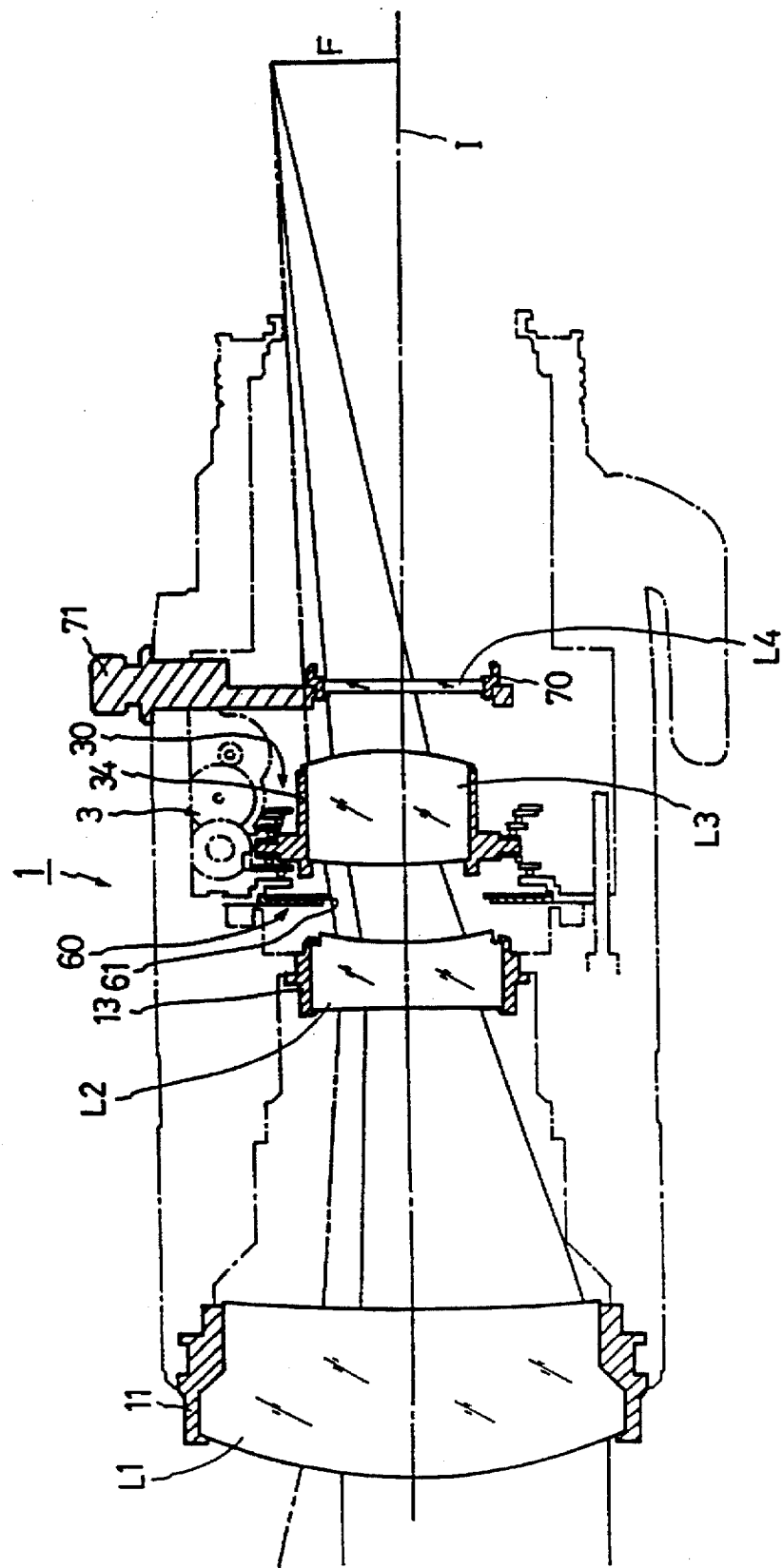
FIG. 3 is an outline diagram of the lens barrel of FIG. 1 showing a harmful light cut-off status when the image blur prevention optical system has moved.

FIGS. 1 through 3 show a first embodiment of a lens barrel in accordance with the present invention. The lens barrel 1 shown in FIGS. 1-3 is a super-telescopic, large-diameter, interchangeable lens barrel, which fits onto a single-lens reflex camera (not shown) and can be freely attached and removed from a single-lens reflex camera. However, although the present invention is described with respect to a super-telescopic, large diameter, interchangeable lens barrel, the present invention is applicable to other types of lens barrels and for use with different types of cameras or photographic optical systems.

As shown in FIG. 1, the lens barrel 1 includes an autofocus (AF) mechanism 2 for performing automatic focusing, an image blur prevention mechanism 3 for preventing image blur which occurs due to camera vibration generated, e.g., by the photographer, and a vibration detection sensor assembly 4 for detecting whether vibration occurs to an extent causing image blur.

The lens barrel 1 comprises a lens barrel front assembly 5 into which the autofocus (AF) mechanism 2 is incorporated, a lens barrel center assembly 6 into which a drive mechanism of the image blur prevention mechanism 3 is incorporated, and a lens barrel rear assembly 7 into which the vibration detection sensor assembly 4 is incorporated. The lens barrel rear assembly 7 fits onto the main body of a camera, such that the lens barrel 1 can be easily attached and removed from the camera.

The lens barrel 1 is also equipped with a first lens group L1, a second lens group L2, and a third lens group L3, which comprise a picture taking lens optical system. The first lens group L1 is a fixed-side lens which is positioned at the front-end section of the lens barrel 1; the second lens group L2 is a focusing lens group which is supported inside the lens barrel 1 so that it can advance and retreat along the optical axis I to perform focusing; and, the third lens group L3 is an image blur prevention lens which is moved in the X-axis and Y-axis directions in a plane perpendicular to the optical axis I to prevent image blur of a subject image on an image-forming plane F (FIG. 2), such as a film plane, generated by camera vibration.

The lens barrel front assembly 5 includes a fixed barrel 10. The first lens group L1 is held in a lens retainer frame 11 at the front end of the fixed barrel 10. Further, an outer circumference of a moving barrel 12 is inset and secured inside the fixed barrel 10, at an inner circumferential section near the lens barrel center assembly 6, so that the moving barrel 12 can freely advance and retreat along the optical axis I. A lens frame 13, which holds the second lens group L2, is attached at the rear end of the moving barrel 12.

A rotating barrel 14 is provided at the outer circumference of the front end of the fixed barrel 10. The rotating barrel 14 is a focusing ring which causes the advance and retreat of the second lens group L2 along the optical axis I when rotated. The rotating barrel 14 is attached onto the outside of the fixed barrel 10 so that it may rotate freely. It is well known that by the rotation of the rotating barrel 14 by a driving force transmission shaft 17 (only a part of which is shown) extending from the body of the camera, the moving barrel 12 is moved in the optical axis I direction, and in connection with the movement of the moving barrel 12 the second lens group L2 inside the lens frame 13 moves to perform focusing.

A main circuit package (not shown) comprising a flexible printed circuit (FPC) board is incorporated into a small diameter section of the fixed barrel 10 and the various electrical components, most notably a CPU, are packaged on the FPC board. The FPC board is electrically connected with the image blur prevention mechanism 3 and the vibration detection sensor assembly 4 by a flexible printed wiring board (not shown) such that drive control of the image blur prevention mechanism 3 can be performed if the conditions require. The vibration detection sensor assembly 4 in the lens barrel rear assembly 7 includes a printed circuit board package 44 comprising a rigid board onto which a vibration detection sensor 40 is packaged with a sensor package mount 41.

The third lens group L3 in the lens barrel center assembly 6 is an image blur prevention lens. An image blur prevention drive mechanism 30 which drives the image blur prevention lens L3 is also included in the lens barrel center assembly 6. The image blur prevention drive mechanism 30 comprises an electric motor 31, which is the drive source, a transmission gear train 35, and a driver 33, which drives a retainer frame 34 of the vibration prevention lens L3 in the X-axis and Y-axis directions.

The lens barrel rear assembly 7 has a fixed barrel section 43, which is configured as a unit in series with a fixed barrel section 32 of the lens barrel center assembly 6 and the fixed barrel 10 of the lens barrel front assembly 5. The rear-end section of the fixed barrel section 43 fits into the camera body (not shown) such that it can be easily attached to and removed from the camera body.

When the lens barrel 1 is a super-telescopic, large-diameter, interchangeable lens barrel, the image blur prevention lens L3 is moved in a plane perpendicular to the optical axis I of the main optical system (comprising lens groups L1, L2, and L3) to prevent image blur. The image blur prevention lens L3 is positioned between an aperture stop 61 of an aperture unit 60, which is located in the path of the main optical system, and a filter optical system L4 which is secured to a filter retainer frame 70. The filter optical system L4 filters specific wavelengths of light to sharpen an image. The aperture unit 60 and the filter optical system L4 are positioned so that a specified interval is left between the filter retainer frame 70 and the aperture stop 61.

In accordance with the first embodiment of the present invention, the aperture unit 60 is attached at the inner circumference of the front side of the lens barrel center assembly 6, and is positioned at the front side of the image blur prevention lens L3 (i.e., the side of incident light from a photographic subject). Further, the filter optical system L4 is located at the rear-end side of the lens barrel 1 at the back side of the image blur prevention lens L3 (the side of exiting light). The filter optical system L4 with filter retainer frame 70 is attached to an inner end of a filter insert holder 71 so that it may be easily inserted from outside the lens barrel 1. The filter insert holder 71 is also attached to the fixed barrel section 32 extending from the outer circumference of the lens barrel center assembly 6 so that it can be easily inserted and removed, and through this arrangement the filter insert holder 71 is configured such that the filter optical system L4 faces the image blur prevention optical system L3 on the optical axis I.

The filter retainer frame 70 of the filter optical system L4 is formed having diameter dimensions which cut off harmful light rays which occur when the image blur prevention lens L3 is shifted in a plane which is perpendicular to the optical axis I.

In accordance with the above-described configuration, the image blur prevention lens L3 is controlled by a control circuit (not shown) to be driven by the drive mechanism 30 according to the amount of vibration detected by the vibration detection sensor 40, thereby performing image blur prevention. During the image blur prevention operation, since the aperture stop 61 is set to a specific aperture value and is located at the front side of the vibration prevention lens L3 with respect to incident light, and the filter retainer frame 70 is set at a diameter dimension which allows harmful light to be cut off and is located at the rear side of the vibration prevention lens L3 with respect to incident light, as is clear from FIGS. 2 and 3, harmful light can be cut off even if the vibration prevention lens L3 is shifted at the specified aperture value. Harmful light may be light of the kind which generates "flares" or other light which deteriorates optical performance.

More specifically, the image blur prevention lens L3, the retainer frame 70 and the aperture stop 61 are arranged such that harmful light, such as that indicated by the long and two short dashed lines in FIG. 3, is appropriately and reliably cut off by the aperture stop 61 and by the filter retainer frame 70, thereby eliminating the problem of deterioration in optical performance.

Further, in accordance with the first embodiment of the present invention, the image blur prevention lens drive mechanism 30 is incorporated into a space in the lens barrel 1 between the aperture unit 60 and the filter optical system L4. More specifically, the drive mechanism 30 is located in a space between a retainer member of the aperture unit 60 (i.e., the part of the fixed barrel section 32 which holds the aperture unit 60) and the filter insert holder 71 of the filter optical system L4.

Therefore, with the above-described arrangement of the image blur prevention drive mechanism 30, penetration of dirt or dust into the image blur prevention drive mechanism 30 can be reliably prevented because the lens drive mechanism 30 is located between the aperture unit 60 and the filter optical system L4. More particularly, penetration of dirt or dust is prevented because the image blur prevention drive mechanism 30 is concealed from the rear side of the lens barrel by the filter optical system L4 and its retainer frame 70. Further, the occurrence of operational defects in the image blur prevention operation of the image blur prevention drive mechanism 30 attributable to dirt or dust can be eliminated.

The present invention is not limited to the above-described embodiment, and various modifications are possible. For example, the shape and the structure of the various parts of the lens barrel 1 can be changed and modified in appropriate ways.

Figure 4:
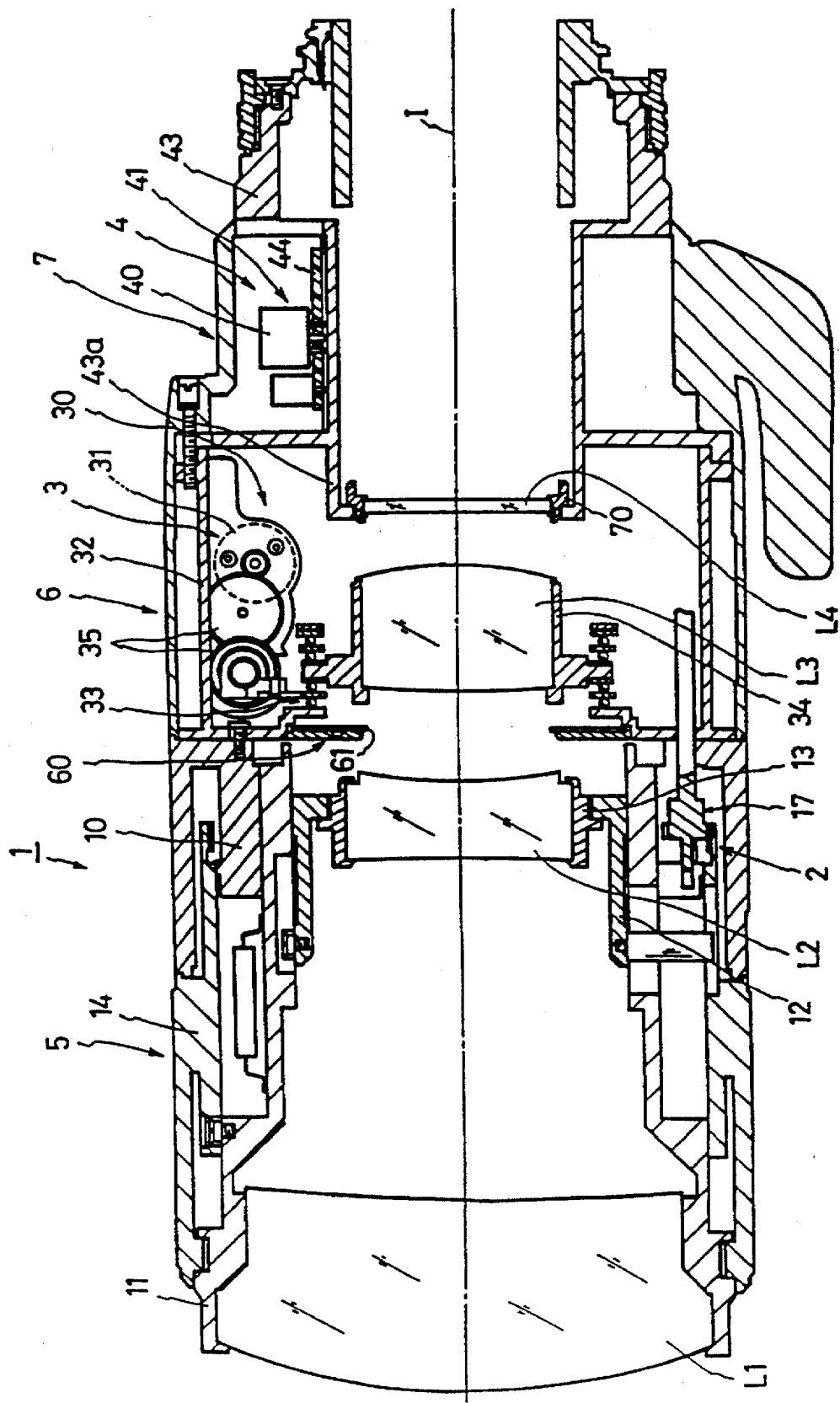
FIG. 4 is a cross-sectional view of a lens barrel in accordance with a second embodiment of the present invention.

For example, FIG. 4 shows a second embodiment of the present invention, wherein the retainer frame 70 of the filter optical system L4 is attached to a front end section 43a of the inner circumference of the fixed barrel section 43. The filter optical system L4 can be easily attached and removed by an insert which employs a device such as a jig extending from the rear-end side of the lens barrel 1. In contrast, in accordance with the above-described first embodiment of the present invention, the filter optical system L4 is attached to the filter insert holder 71 such that the filter optical system L4 can be easily replaced. Further, in accordance with the second embodiment of the invention shown in FIG. 4, the image blur prevention lens drive mechanism 30 is positioned between a retainer member of the aperture unit 60 and the front-end section 43a of the fixed barrel section 43.

Moreover, the first embodiment of the present invention was described with respect to a lens barrel 1 which is fit into a single-lens reflex camera; however, the present invention is not limited to a lens barrel for a single lens reflex camera, and the present invention may be effectively applied to an image blur prevention mechanism provided in lens barrels for various types of cameras and other photographic optical system.

Therefore, in accordance with embodiments of the present invention, the lens barrel includes an image blur prevention optical system L3, which is moved in a plane perpendicular to the optical axis I of the main optical system to prevent image blur. The image blur prevention optical system L3 is located between the aperture stop 61 of the aperture unit 60, located in the path of the main optical system, and the filter optical system L4 which is secured to the filter retainer frame 70 and a specified interval is left between the filter retainer frame 70 and the aperture stop 61. More specifically, the aperture stop 61 and the filter retainer frame 70 are located at the light incident side and light exiting side, respectively, of the image blur prevention optical system L3. Thereby, harmful light on the incident side and exiting side of the image blur prevention optical system L3 can be cut off by appropriate arrangement of the aperture stop 61 and filter retainer frame 70.

Therefore, with only the minimum necessary number of structural components, and without attaching a flare stopper, harmful light can be appropriately cut off, and not only can the configuration of the lens barrel be simplified and the cost reduced, but deterioration in optical performance can be controlled.

Further, in accordance with embodiments of the lens barrel of the present invention, an image blur prevention lens drive mechanism 30, which moves the image blur prevention optical system L3 in a plane perpendicular to the optical axis I, is incorporated into the space between the retainer member of the aperture unit 60 and the retainer member which holds the filter retainer frame 70 of the filter optical system L4. Thereby, the penetration of dirt or dust from the rear-end side of the lens barrel into the drive mechanism attachment section can be prevented by the filter optical system L4, and operational defects in the image blur prevention operation of the image blur prevention drive mechanism can be eliminated.

Moreover, in accordance with embodiments of the present invention, by attaching the filter optical system L4 to an insert-type filter holder and attaching the insert type holder to the lens barrel so that it can be easily attached and removed, there is an advantage in that the filter optical system L4 can also be easily attached and removed.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A lens barrel, comprising:
    an image blur prevention optical system movable to prevent image blur;
    a filter optical system positioned at a light exiting side of the image blur prevention optical system;
    an aperture unit positioned at a light incident side of the image blur prevention optical system,
        wherein the filter optical system and the aperture unit are positioned to block harmful light in the lens barrel.
2. A lens barrel as recited in claim 1, wherein the filter optical system includes a filter retainer frame to hold the filter optical system and the aperture unit includes an aperture stop, and the filter retainer frame and the aperture stop are positioned to block harmful light in the lens barrel.
3. A lens barrel as recited in claim 2, wherein the aperture stop is positioned at a light incident side of the image blur prevention optical system and the filter retainer frame is positioned at a light exiting side of the image blur prevention optical system.
4. A lens barrel as recited in claim 3, wherein a specified interval is maintained between the aperture stop and the filter retainer frame.
5. A lens barrel as recited in claim 4, further comprising:
    an image blur prevention drive mechanism to move the image blur prevention optical system to prevent image blur, wherein the aperture stop and the filter retainer frame are positioned to block harmful light in the lens barrel resulting from movement of the image blur prevention optical system.
6. A lens barrel as recited in claim 3, wherein the aperture stop is set to an aperture value which cuts off harmful light on the incident side of the image blur prevention optical system and the filter retainer frame has a diameter which cuts off harmful light at the light exiting side of the image blur prevention optical system.
7. A lens barrel, comprising:
    a filter optical system retainer member to hold a filter optical system;
    an aperture unit retainer member to hold an aperture unit;
    a fixed barrel section of the lens barrel; and
    a lens drive mechanism positioned in a space bounded by the fixed barrel section, the filter optical system retainer member and the aperture unit retainer member.
8. A lens barrel as recited in claim 7, wherein the filter optical system retainer member is positioned between the lens drive mechanism and a rear-end side of the lens barrel.
9. A lens barrel, comprising:
    a main optical system having an optical axis;
    an image blur prevention optical system;
    an image blur prevention optical system drive mechanism to move the image blur prevention optical system in a plane perpendicular to the optical axis of the main optical system to prevent image blur;
    an aperture unit having an aperture stop positioned on a light incident side of the image blur prevention optical system in an optical path of the main optical system;
    a filter optical system; and
    a filter retainer frame to hold the filter optical system and positioned on a light exiting side of the image blur prevention optical system, wherein a specified interval is maintained between the aperture stop and the filter retainer frame to block harmful light in the lens barrel.
10. A lens barrel as recited in claim 9, wherein the aperture stop is set to an aperture value which cuts off harmful light on the light incident side of the image blur prevention optical system and the filter retainer frame has a diameter which cuts off harmful light on the light exiting side of the image blur prevention optical system.
11. A lens barrel as recited in claim 9, further comprising:
    an aperture unit retainer member to hold the aperture stop; and
    a retainer member to hold the filter retainer frame of the filter optical system,
        wherein the image blur prevention optical system drive mechanism is positioned between the aperture unit retainer member and the filter retainer frame retainer member.
12. A lens barrel as recited in claim 11, wherein the filter optical system is positioned between the image blur prevention optical system drive mechanism and a rear-end side of the lens barrel to shield the image blur prevention optical system drive mechanism from the rear-end side of the lens barrel.
13. A lens barrel as recited in claim 10, further comprising a filter insert holder insertable into and removable from the lens barrel wherein the filter retainer frame is attached to the filter insert holder.
14. A lens barrel as recited in claim 10, wherein the aperture stop and the filter retainer frame cut off harmful light when the image blur prevention optical system is moved in a plane perpendicular to the optical axis.
15. A lens barrel, comprising:
    a fixed barrel section at a rear-end side of the lens barrel;
    a filter optical system;
    a filter retainer frame to hold the filter optical system;
    an aperture unit including an aperture stop; and
    an image blur prevention optical system located between the aperture unit and the filter optical system,
        wherein the filter retainer frame holding the filter optical system is attached to a front-end section of an inner circumference of the fixed barrel section, and the filter retainer frame and the aperture stop are positioned to block harmful light in the lens barrel.

16. A lens barrel, comprising:

a filter optical system;

a filter retainer frame to hold the filter optical system;

a filter insert holder attached to the filter retainer frame, the filter insert holder being insertable into and removable from the lens barrel;

an aperture unit including an aperture stop; and an image blur prevention optical system located between the aperture unit and the filter optical system, wherein the filter retainer frame and the aperture stop are positioned to block harmful light in the lens barrel.

17. A lens barrel, comprising:

a main optical system having an optical axis;

an image blur prevention optical system;

an image blur prevention optical system drive mechanism to move the image blur prevention optical system to prevent image blur;

an aperture unit having an aperture stop positioned on a light incident side of the image blur prevention optical system in an optical path of the main optical system;

a filter optical system;

a filter retainer frame to hold the filter optical system and positioned on a light exiting side of the image blur prevention optical system such that a specified interval is maintained between the aperture stop and the filter retainer frame; and a fixed barrel section at a rear-end side of the lens barrel, wherein the filter retainer frame is attached to a front-end section of an inner circumference of the fixed barrel section.

18. A lens barrel as recited in claim 17, further comprising a filter insert holder insertable into and removable from the lens barrel, wherein the filter retainer frame is attached to the filter insert holder.

* * * * *